(12) United States Patent
Redemann et al.

(10) Patent No.: US 11,111,975 B2
(45) Date of Patent: Sep. 7, 2021

(54) BRAKE CALIPER OF A DISC BRAKE FOR MOTOR VEHICLES

(71) Applicant: WABCO Europe BVBA, Brussels (BE)

(72) Inventors: Bernward Redemann, Hockenheim (DE); Vitalij Scherer, Leimen (DE); Martin Stumpf, Lampertheim (DE)

(73) Assignee: WABCO EUROPE BVBA

( * ) Notice: Subject to any disclaimer, the term of this patent is extended or adjusted under 35 U.S.C. 154(b) by 27 days.

(21) Appl. No.: 16/567,157

(22) Filed: Sep. 11, 2019

(65) Prior Publication Data

US 2020/0088253 A1  Mar. 19, 2020

(30) Foreign Application Priority Data

Sep. 17, 2018 (EP) .................................... 18194725

(51) Int. Cl.
| | | |
|---|---|---|
| *F16D 55/00* | (2006.01) | |
| *F16D 65/00* | (2006.01) | |
| *F16D 55/2265* | (2006.01) | |
| *F16D 66/02* | (2006.01) | |
| *F16D 121/04* | (2012.01) | |

(52) U.S. Cl.
CPC ..... *F16D 65/0068* (2013.01); *F16D 55/2265* (2013.01); *F16D 66/021* (2013.01); *F16D 2055/0016* (2013.01); *F16D 2121/04* (2013.01)

(58) Field of Classification Search
CPC .. F16D 55/226; F16D 55/227; F16D 65/0068; F16D 65/092; F16D 65/183; F16D 65/568

USPC .... 188/71.1, 71.8, 71.9, 73.39, 73.45, 73.46
See application file for complete search history.

(56) References Cited

U.S. PATENT DOCUMENTS

| | | | | |
|---|---|---|---|---|
| 6,257,378 | B1* | 7/2001 | Girkin | F16D 55/227 188/72.4 |
| 7,808,374 | B2 | 10/2010 | Schmitt et al. | |
| 9,933,028 | B2* | 4/2018 | Falter | F16D 65/092 |
| 10,316,909 | B2* | 6/2019 | Klingner | F16D 65/568 |
| 2002/0017436 | A1* | 2/2002 | Ortegren | F16D 65/183 188/73.31 |
| 2004/0195054 | A1* | 10/2004 | Thomas | F16D 55/224 188/73.1 |
| 2011/0127120 | A1* | 6/2011 | Stumpf | B23C 3/00 188/71.1 |
| 2017/0234382 | A1* | 8/2017 | Stoeger | F16D 55/226 188/73.31 |
| 2018/0187730 | A1* | 7/2018 | Lethorn | F16D 65/0068 |

FOREIGN PATENT DOCUMENTS

| | | |
|---|---|---|
| DE | 102008035753 A1 | 2/2010 |
| DE | 102014115764 A1 | 5/2016 |
| WO | 2007140985 A1 | 12/2007 |
| WO | 2010051997 A2 | 5/2010 |
| WO | 2014041155 A1 | 3/2014 |

* cited by examiner

*Primary Examiner* — Christopher P Schwartz
(74) *Attorney, Agent, or Firm* — Dickinson Wright PLLC

(57) ABSTRACT

A brake caliper (1) for a disc brake has a tensioning side (2) and a rim side (3) and bears a brake cylinder flange face (4), which, for receiving a brake cylinder, is disposed on the tensioning side (2). Two sliding bushes (5, 6) for an axial displacement of the brake caliper (1) are disposed on a brake support, and two flange faces (8, 8a) are disposed axially parallel to each other on the tensioning side (2) between the sliding bushes (5, 6) for receiving a sensor resetting unit (9).

16 Claims, 6 Drawing Sheets

BRAKE CALIPER OF A DISC BRAKE FOR MOTOR VEHICLES

TECHNICAL FIELD

The present disclosure relates to a brake caliper of a disc brake for motor vehicles, in particular for commercial vehicles. Brake calipers for disc brakes are well known.

BACKGROUND

A multiplicity of variants of brake calipers are known in the industry. There are fixed calipers, floating calipers, or pendulum calipers. The present disclosure relates to a floating caliper, in particular a single-piston floating caliper, also referred to as a single-cylinder floating caliper, wherein the floating caliper also is known under the term "sliding caliper". Hereinafter the term "brake caliper" will generally be used. The brake caliper has a tensioning side and a rim side. An opening for receiving a brake disc, a rim-side brake pad, and a tensioning-side brake pad is disposed between the tensioning side and the rim side. A tensioning installation that is disposed on the tensioning side in the brake caliper comprises a rotary lever, a spindle having a pressure plate, and a pressure plate. The tensioning installation tensions the brake disc by way of the brake pads. The rim-side brake pad is fixedly fastened to the brake caliper. The brake caliper by way of sliding bushes is mounted on a brake support so as to be displaceable ("floating") axially in the direction of the brake disc. The brake caliper on the tensioning side moreover has a flange face for receiving a sensor resetting unit. The sensor resetting unit comprises a sensor and a resetting installation. The resetting installation serves for actuating and resetting the spindle so as to be able to replace brake pads in the course of maintenance, for example. The sensor of the sensor resetting unit is a wear sensor for monitoring the thickness of the brake pads. The sensor resetting unit can be damaged by impacting a foreign object in the assembly, during transportation, or on account of external influences on bad roads (rocks, branches, etc.). A damage to the sensor resetting unit can lead to the sensor function and the resetting installation or the sealing of the brake interior space malfunctioning or being affected, respectively. Damage to the sensor resetting unit can also take place on account of the high deadweight of the brake caliper when the brake caliper is placed down or temporarily stored without any special packaging.

A brake caliper having a sensor resetting unit is described in WO2007/140,985A1. The sensor resetting unit is disposed directly on the housing of the brake caliper, below a flange face for a brake cylinder. The disposal of the sensor resetting unit across the entire area on the brake caliper protects the sensor resetting unit against the effect of impact and shock by external environmental influences but does require machining of the brake caliper in the region of the sensor resetting unit. In order for the sensor resetting unit to be disposed in the brake caliper, the brake caliper after the casting method was post-machined by milling methods, wherein planar milling and profile milling was performed. The additional operated steps by the milling tools require additional undesirable costs in the production and the machining time of the brake caliper, on account of which the completion of the brake caliper is temporally delayed.

SUMMARY

It is an object of the present disclosure to provide a brake caliper which offers a cost-neutral and reliable protection of the sensor resetting unit against the effect of impact and shock by external environmental influences.

The object is thereby achieved in that a brake caliper on a tensioning side between a first sliding bush and a flange face has a first rib and/or between a second sliding bush and the flange face has a second rib. Depending on the number of sensor plugs of the sensor resetting unit and on the disposal of said sensor plug/plugs of the sensor resetting unit, the brake caliper can have one rib or two ribs. The rib protects that region of a sensor resetting unit that is not covered by a brake caliper housing. In one preferred embodiment, the rib covers a corrugation of the brake caliper. Levelling the corrugation by casting is not economical and is not cost-neutral. More raw materials (steel, for example) are required as opposed to the disposal of a rib.

In one further preferred design embodiment, the external contour of the at least one of the first rib and the second rib corresponds to or is larger than the external contour of the sensor resetting unit.

The sensor resetting unit is an individual component which in terms of the geometry or circumference, respectively, can be variably embodied, depending on the customer requirement. The variable circumference of the sensor resetting unit requires the rib to be adapted to the circumference of the sensor resetting unit. A reliable protection with respect to external environmental influences is guaranteed only in the case of a complete coverage of the sensor resetting unit by the brake caliper housing and the rib.

It has furthermore been demonstrated that the first rib or the second rib in one further design embodiment is disposed at a spacing distance from the sensor resetting unit. In other words, the first rib and the sensor resetting unit, or the second rib and the sensor resetting unit, are not in physical contact. Post-machining of the rib faces by way of a milling tool is not required. The first rib or the second rib serves only for the protection of the sensor resetting unit with respect to external environmental influences. Post-machining is required only on the flange faces of the sub-part of the brake caliper housing but not on the first rib or the second rib.

At least one of the first rib and the second rib in one further design embodiment, are/is shaped from the brake caliper housing. The brake caliper is cast, conjointly with the first rib and, if applicable, the second rib in a casting method. Additional operated steps such as welding, riveting, screw-fitting, or adhesive bonding are not required in order for the first rib or the second rib to be disposed on the brake caliper.

It has advantageously been furthermore shown that the first rib and optionally the second rib are disposed on the brake caliper housing in a direction radially opposed to a brake cylinder flange face. The first rib and optionally the second rib are part of the brake caliper housing. Specifically, the first rib and optionally the second rib are disposed between a sub-part of the brake caliper housing and the flange face for receiving the readjustment installation. The flange faces of the sensor resetting unit, in a direction opposed to a rim side of the brake caliper, project axially with respect to the brake caliper housing and the first rib and optionally the second rib. This means that a spacing distance exists between the sensor resetting unit and the first rib and optionally the second rib.

The brake caliper and the first rib and optionally the second rib in one further design embodiment are/is formed from the same material. The material is preferably cast iron.

In a last embodiment, the first rib and optionally the second rib have a width of at least 4 mm. A smaller width of the first rib and/or of the second rib would lead to the premature appearance of ruptures on account of which the protection of the sensor resetting unit is no longer guaranteed. The first rib and optionally the second rib preferably have a width of 4.5 mm. A wider rib increases the weight and the material input of the brake caliper, this being undesirable for cost reasons.

Selected examples of the present disclosure will be explained hereunder by reference to the appended drawings. The drawings are provided herewith for purely illustrative purposes and are not intended to limit the scope of the present invention.

DETAILED DESCRIPTION OF THE DRAWINGS

Figure 1:
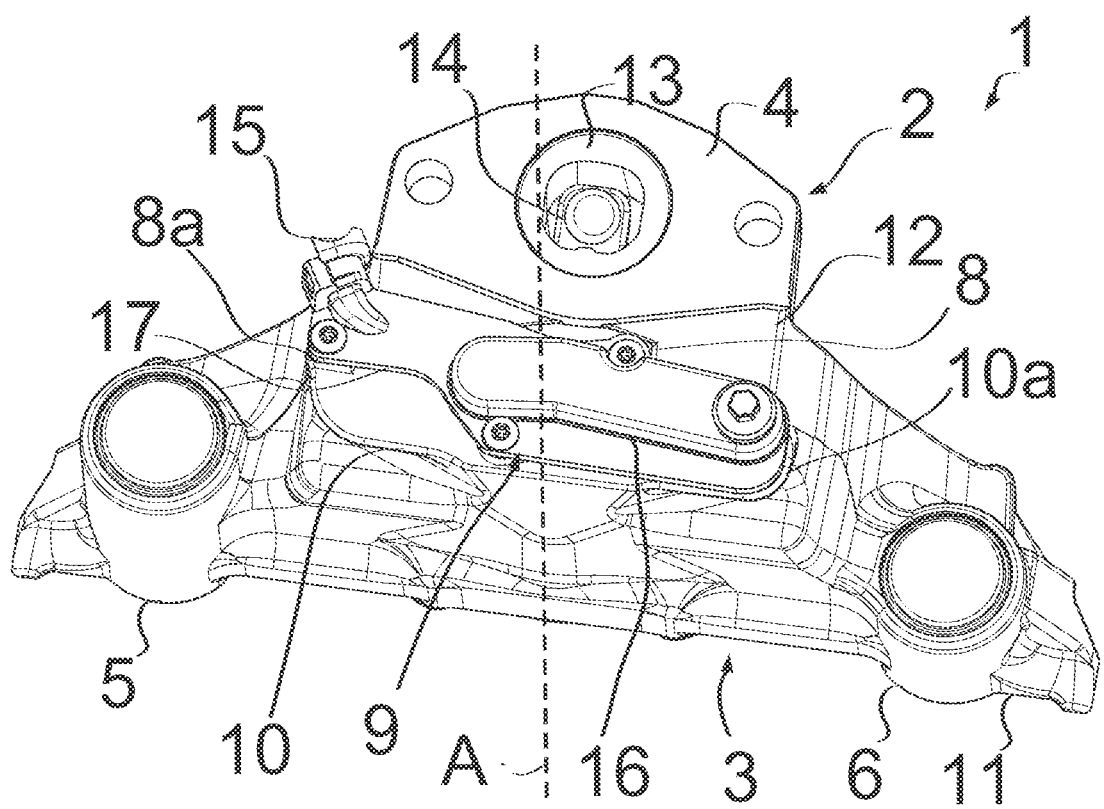
FIG. 1 shows a brake caliper having a first rib, a second rib, and a sensor resetting unit.

FIG. 1 shows a brake caliper 1, seen from the tensioning side. The brake caliper 1 is produced from cast iron and on the tensioning side 2 has a brake cylinder flange face 4. An opening 13 for activating a rotary lever 14 is disposed so as to be centric to the brake cylinder flange face 4. The brake caliper 1 between the tensioning side 2 and a rim side 3 has a brake disc opening 7 (FIG. 3) for receiving a brake disc (not shown). During a tensioning procedure, the rotary lever 14 tensions the brake disc by way of a tensioning installation. During a braking procedure, two sliding bushes 5, 6 which are disposed so as to be axially parallel to an axis A of the brake caliper 1 displace the brake caliper 1 axially on a brake support (not shown). The brake caliper 1, radially below the brake cylinder flange face 4, in the direction of the first sliding bush 5 and the second sliding bush 6, for receiving flange faces 8, 8a has a sub-part 12 of a brake caliper housing 11. A sensor resetting unit 9 is disposed on the brake caliper 1 by way of the flange faces 8, 8a. The sensor resetting unit 9 has a sensor plug 15 and a resetting installation 16, and a support plate 17 for receiving the sensor plug 15 and the resetting installation 16. The resetting installation 16 is disposed peripherally on the brake caliper 1, thus so as to be axially parallel to the axis A of the brake caliper 1. A first rib 10 and a second rib 10a for protecting the sensor resetting unit 9 against environmental influences are additionally shaped from the brake caliper housing 11 on the sub-part 12 of the brake caliper housing 11, in a direction radially opposed to the brake cylinder flange face 4. The first rib 10 and the second rib 10a form a unit with the flange 8 for receiving the resetting installation 16. The flange faces 8, 8a project axially in relation to the first rib 10 and the second rib 10a. The first rib 10 and the second rib 10a in the exemplary embodiment enable a disposal of the sensor resetting unit 9 counter to the sensor plug 15 or in the direction of the sensor plug 15.

Figure 2:
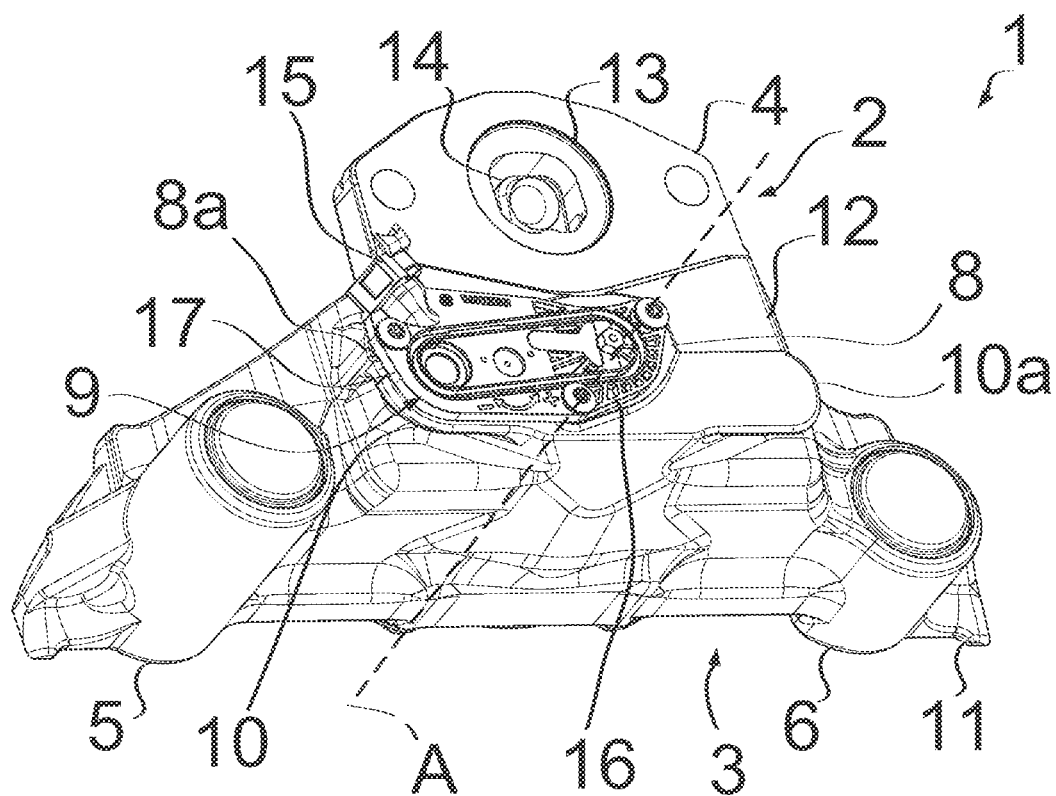
FIG. 2 shows a brake caliper having a first rib, a second rib, and a second disposal of the sensor resetting unit.

FIG. 2 shows a brake caliper 1 as per FIG. 1. Only, the resetting installation 16 is disposed so as to be axial in relation to the axis A of the brake caliper 1. Moreover, the sensor resetting unit 9 is disposed on the first rib 10.

Figure 3:
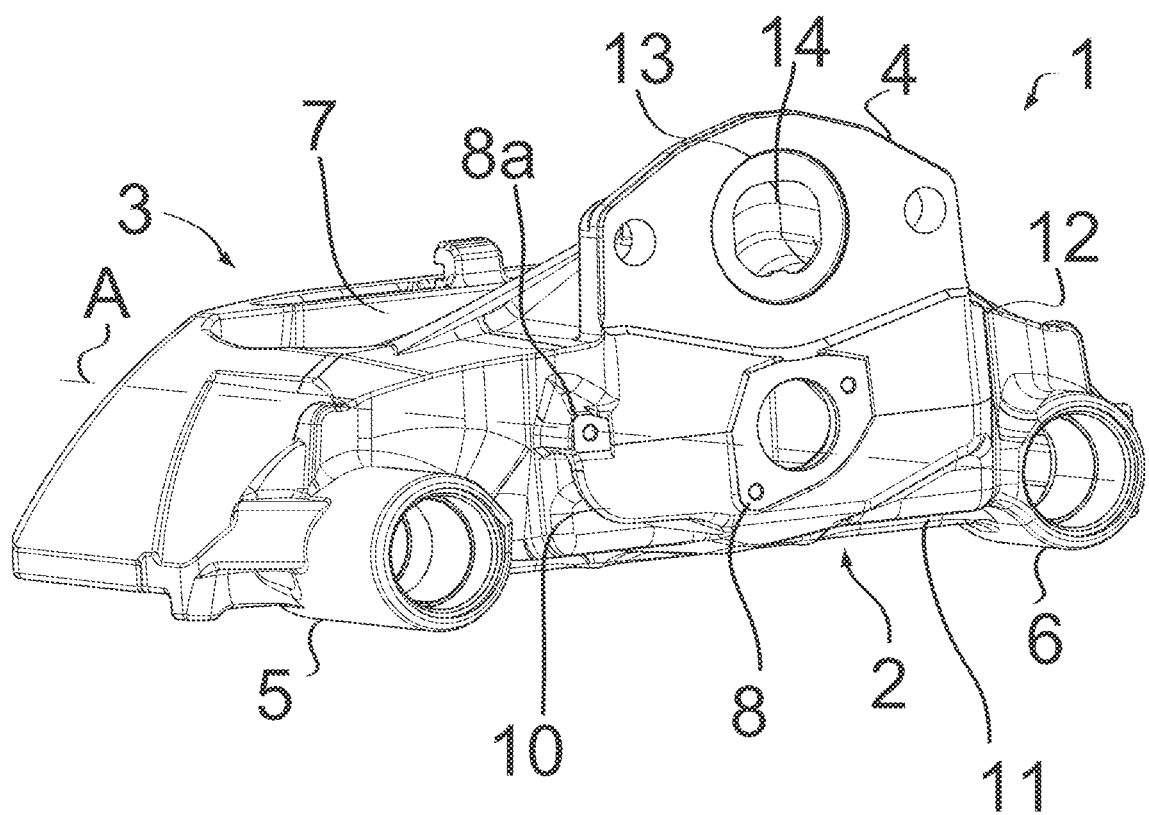
FIG. 3 shows a brake caliper having a first rib without a sensor resetting unit.

FIG. 3 shows the brake caliper as per FIGS. 1 and 2 in a lateral rotated perspective. As opposed to FIGS. 1 and 2, only a first rib 10 is shaped from the brake caliper. Moreover, the brake caliper 1 is shown without a sensor resetting unit 9. FIG. 3 highlights the linking of the first rib 10 to the sub-part 12 of the brake caliper housing 11, and the linking of the first rib 10 to the flange 8 for receiving the resetting installation 16.

Figure 4:
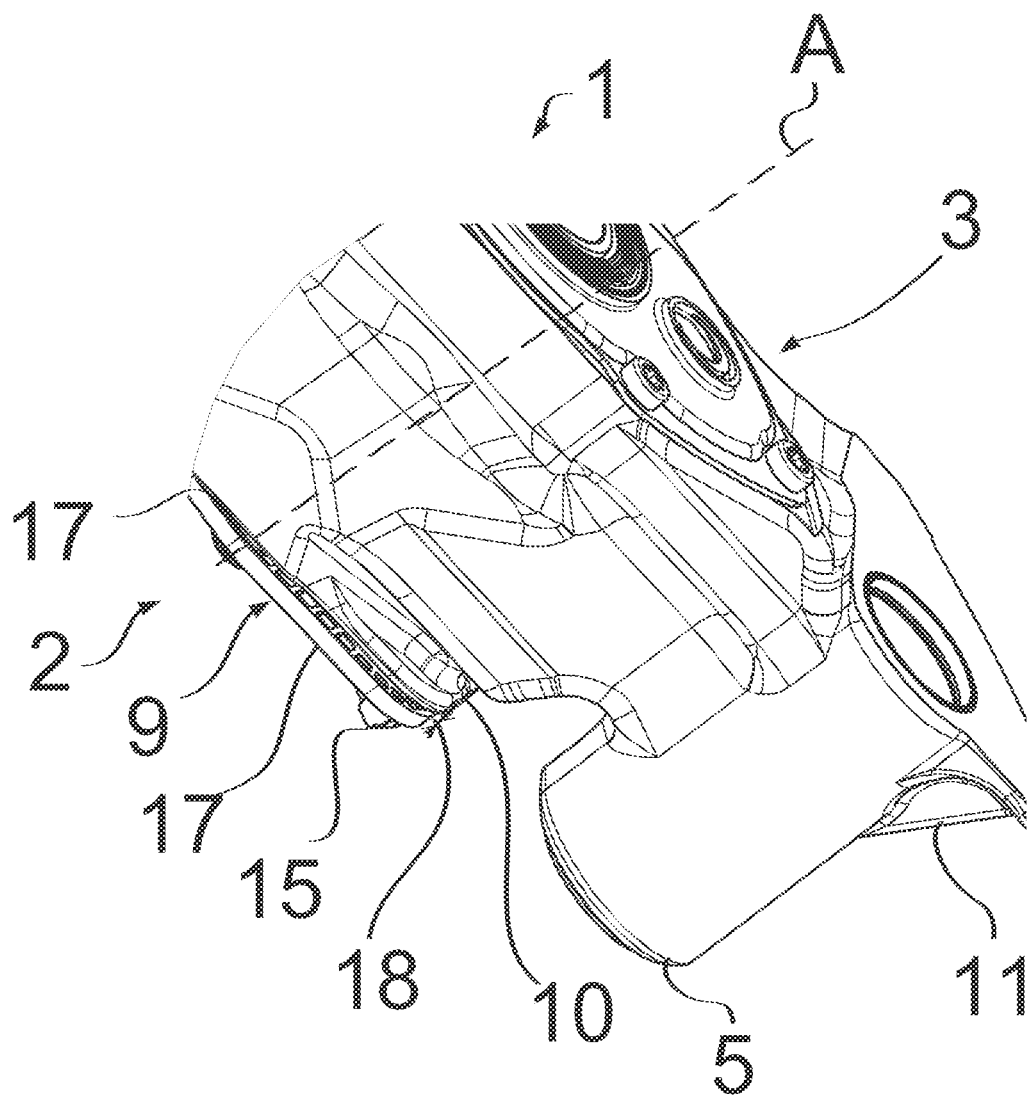
FIGS. 4-5 show the lower side of a brake caliper having a first rib in a detailed view.
Figure 5:
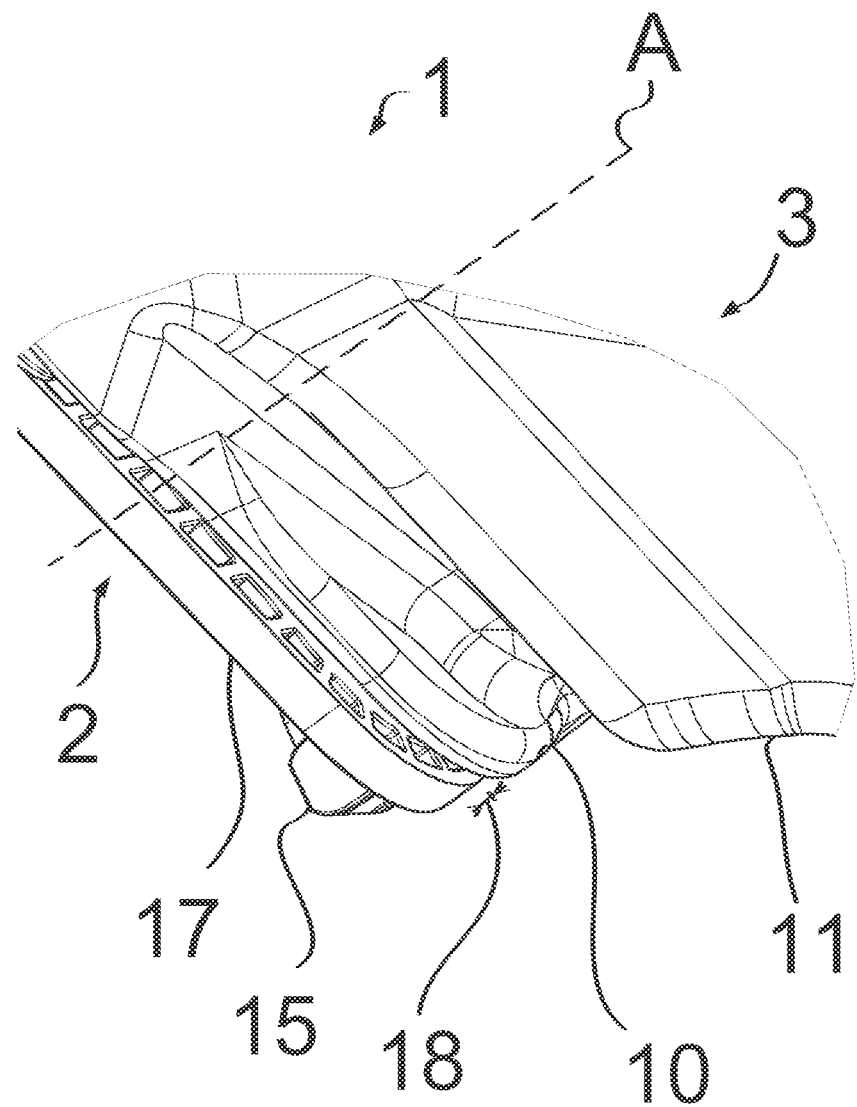

FIGS. 4 and 5 show a partial view of the brake caliper 1 as per FIGS. 1 to 3, having a disposal of the sensor resetting unit 9 as per FIG. 2. FIG. 4 highlights in particular the shaping of the first rib 10 from the brake caliper housing 11. Moreover, it is shown in detail that the first rib 10 does not bear on the support plate 17 of the sensor resetting installation 9. In other words, the support plate 17 of the sensor resetting installation 9 and the first rib 10 are disposed at a spacing distance 18.

Figure 6:
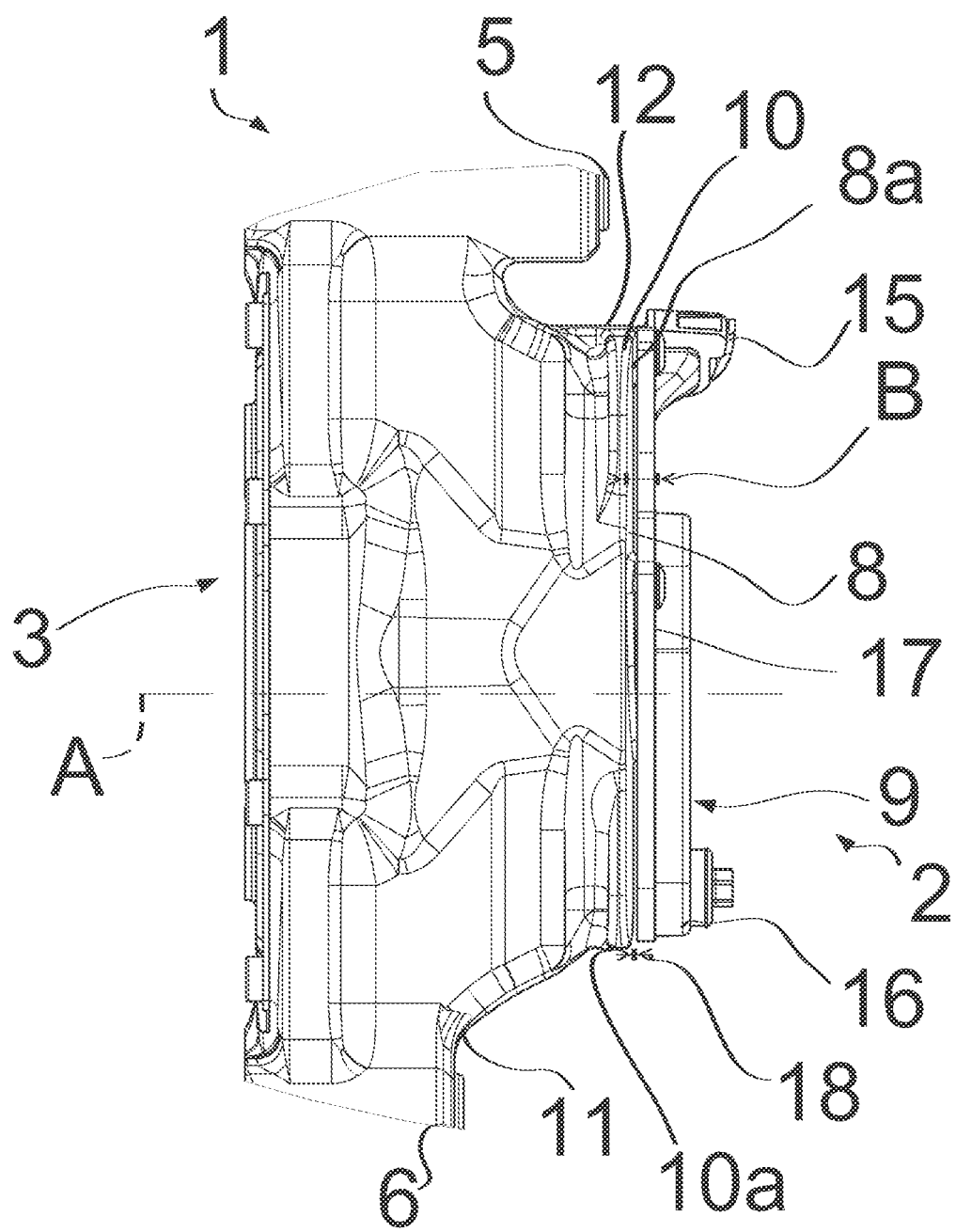
FIG. 6 shows the lower side of a brake caliper having a first rib and a second rib.

FIG. 6 shows the brake caliper 1, having a first rib 10 and a second rib 10a as per FIGS. 1 and 2, seen from the lower side, wherein the resetting unit 9 is disposed as per FIG. 1. The sensor resetting unit 9 bears only on the flange faces 8, 8a, and not on the first rib 10 or the second rib 10a. The first rib 10 and the second rib 10a have a width B of 4.5 mm.

While the above description constitutes the preferred embodiments of the present invention, it will be appreciated that the invention is susceptible to modification, variation and change without departing from the proper scope and fair meaning of the accompanying claims.

LIST OF REFERENCE SIGNS AS PART OF THE SPECIFICATION

1 Brake caliper
2 Tensioning side
3 Rim side
4 Brake cylinder flange face
5 First sliding bush
6 Second sliding bush
7 Brake disc opening
8, 8a Flange face
9 Sensor resetting unit
10 First rib
10a Second rib
11 Brake caliper housing
12 Sub-part of the brake caliper housing
13 Opening of the brake cylinder flange face
14 Rotary lever
15 Sensor plug
16 Resetting installation
17 Support plate
18 Spacing of the first and second ribs from the support plate
A Axial axis
B Width of the first rib

The invention claimed is:

1. A brake caliper (1) for a disc brake, having a tensioning side (2) and a rim side (3), comprising:
a brake cylinder flange face (4), which, for receiving a brake cylinder, is disposed on the tensioning side (2);
a first sliding bush (5) and a second sliding bush (6) for an axial displacement of the brake caliper (1) disposed on a brake support;
a first flange face (8) and a second flange face (8a), which, for receiving a sensor resetting unit (9), are disposed axially parallel to each other on the tensioning side (2) between the first sliding bush (5) and the second sliding bush (6), wherein the brake caliper (1) has at least one of a first rib and a second rib, the first rib (10) being disposed on the tensioning side (2) between the first sliding bush (5) and the first flange face (8), in a direction radially opposed to the brake cylinder flange face (4), and the second rib being disposed between the second sliding bush (5) and the first flange face, in a further direction radially opposed to the brake cylinder flange face (4).

2. The brake caliper (1) as claimed in claim 1, wherein an external contour of the at least one of the first rib (10) and the second rib (10a) corresponds to or is larger than an external contour of the sensor resetting unit (9) to be received by the first and second flange faces (8, 8a).

3. The brake caliper (1) as claimed in claim 1, wherein the at least one of the first rib (10) and the second rib is disposed at a spacing distance (18) from the first and second flange faces (8, 8a).

4. The brake caliper (1) as claimed in claim 1, wherein the at least one of the first rib (10) and the second rib (10a) is shaped from a brake caliper housing (11).

5. The brake caliper (1) as claimed in claim 1, wherein the at least one of the first rib (10) and the second rib (10a) is disposed on a brake caliper housing (11) in a direction radially opposed to the brake cylinder flange face (4).

6. The brake caliper (1) as claimed in claim 1, wherein the at least one of the first rib (10) and the second rib (10a) is formed from the same material as the brake caliper (1).

7. The brake caliper (1) as claimed in claim 1, wherein the at least one of the first rib (10) and the second rib has a width (B) of at least 4 mm.

8. The brake caliper (1) as claimed in claim 1, wherein the first rib (10) and the second rib (10a) extend generally parallel to the first flange face (8) and the second flange face (8a).

9. The brake caliper (1) as claimed in claim 1, wherein the brake cylinder flange face is above the first and second ribs (10, 10a) and the first and second ribs (10, 10a) are below the brake cylinder flange face (4).

10. The brake caliper (1) as claimed in claim 1, wherein the first rib (10) and the second rib (10) extend generally perpendicular to the axial direction.

11. The brake caliper (1) as claimed in claim 1, wherein the first rib (10) and the second rib (10) are spaced away from the first sliding bush and the second sliding bush.

12. The brake caliper (1) as claimed in claim 1, wherein the first rib (10) and the second rib (10a) are axially recessed relative to the first and second flange faces (8, 8a) and the first and second flange faces (8, 8a) project axially in relation to the first and second ribs (10, 10a) such that a support plate (17) of a sensor resetting installation is axially spaced from the first and second ribs (10, 10a).

13. A brake caliper (1) for a disc brake, having a tensioning side (2) and a rim side (3), comprising:
- a brake cylinder mounting face (4) disposed on the tensioning side (2);
- a first sliding bush (5) and a second sliding bush (6) for an axial displacement of the brake caliper (1) disposed on a brake support;
- a first flange face (8) and a second flange face (8a) disposed axially parallel to each other on the tensioning side (2) between the first sliding bush (5) and the second sliding bush (6),
- wherein the brake caliper (1) includes a first rib (10) and a second rib (10a), the first rib (10) being disposed on the tensioning side (2) and extending radially between the first sliding bush (5) and the first flange face (8) and radially away from the brake cylinder mounting face (4), and the second rib (10a) extending radially between the second sliding bush (5) and the first flange face (8) and radially away from the brake cylinder mounting face (4);
- wherein the first rib (10) and the second rib (10a) are generally parallel to the first flange face (8) and the second flange face (8a).

14. The brake caliper (1) as claimed in claim 13, wherein the first rib (10) and the second rib (10a) are disposed on a surface recessed in relation to the first flange face (8) and the second flange face (8a).

15. The brake caliper (1) as claimed in claim 13, wherein the first rib (10) and the second rib (10a) are generally perpendicular to the axial direction.

16. The brake caliper (1) as claimed in claim 13, wherein the brake cylinder mounting face is disposed above the first b (10) and the second rib (10a).

* * * * *